United States Patent [19]

Lin et al.

[11] Patent Number: 5,240,541
[45] Date of Patent: Aug. 31, 1993

[54] METHOD OF FABRICATING A LAMINATED STRIP OF AMORPHOUS METAL

[75] Inventors: Kou C. Lin, Hermitage; Frank R. Zickar; Eugene E. Zook, both of Sharon; Paul W. Martincic, Sharpsville, all of Pa.

[73] Assignee: Asea Brown Boveri, Inc., Purchase, N.Y.

[21] Appl. No.: 739,710

[22] Filed: Aug. 2, 1991

Related U.S. Application Data

[62] Division of Ser. No. 485,645, Feb. 27, 1990, Pat. No. 5,037,706.

[51] Int. Cl.$^5$ .............................................. B32B 31/00
[52] U.S. Cl. ...................................... 156/270; 29/609; 156/281; 156/303; 156/324; 428/114; 428/189; 428/212; 428/593
[58] Field of Search ............... 156/270, 303, 281, 324; 428/114, 212, 189, 593; 336/234; 29/609

[56] References Cited

U.S. PATENT DOCUMENTS 4,201,837  5/1980  Lupinski ........................ 156/272.4
4,413,406  11/1983  Bennett et al. .................... 29/609

Primary Examiner—John J. Gallagher
Attorney, Agent, or Firm—Leonard Bloom

[57] ABSTRACT

A laminated amorphous metal strip has a first layer having at least two side-by-side strips of amorphous metal of unequal widths. A second layer has at least two side-by-side strips of amorphous metal of unequal widths, the layers being in reverse order with respect to the widths of the strips such that the wider strips overlap and form a brickwork cross-section pattern. A flexible polymeric bonding material is disposed between the layers. The polymeric bonding material is an adhesive and has excellent electrical properties. A device for forming the laminated strip of amorphous metal has a plurality of rolls of amorphous metal. Strips from a roll are positioned side-by-side with strips from a wider roll. A bonding material is applied from spray guns to the surface of the strips. Strips from a roll of metal and a wide roll of metal are positioned on the bonding material in a reverse order of the wider strips. Pressure is applied to the laminate. The laminate is advanced by a continuous belt to which the laminate is magnetically coupled. The device includes a means for cutting the laminate to a desired length. A method for fabricating a laminated strip of amorphous metal includes providing the rolls of metal, positioning the strips having differing widths, applying the bonding material, applying pressure advancing the laminate and cutting the laminate.

3 Claims, 3 Drawing Sheets

METHOD OF FABRICATING A LAMINATED STRIP OF AMORPHOUS METAL

This application is a division of application Ser. No. 485,645, filed Feb. 27, 1990, now U.S. Pat. No. 5,037,706.

FIELD OF THE INVENTION

The present invention relates to strips of amorphous metal laminated and bonded with a polymeric material.

BACKGROUND OF THE INVENTION

Amorphous metal is becoming more widely used in the fabrication of transformer cores because of the improved electrical properties of this material compared with the regular grain oriented electrical steel.. However, the amorphous metal is usually available on rolls of relatively thin sheets having a narrow width. This form of the metal introduces problems in using the narrow strips in forming the transformer core.

U.S. Letters Pat. No. 4,615,106 issued to Grimes et al disclose a wound core, the edges of which are thermally sprayed with an electrically non-conducting material. A fabrication process for forming amorphous metal cores for a transformer is disclosed in U.S. Letters Pat. No. 4,413,406 issued to Bennett et al. Four metal sheets are disclosed which are adjacent to each other and are heat bonded together with a metallic bonding agent. The bonded composite sheet is cut transversely of its length with packets of predetermined length. The width of the packet may be increased. U.S. Letters Pat. Nos. 3,283,281 issued to Stein et al; 3,156,886 issued to Sutherland and 3,015,791 issued to Rolf disclose laminated layers for transformer cores which have conventional electrical steel members of differing lengths in the adjacent layers. The use of epoxy resin to insulate magnetic thin films from each other is disclosed in U.S. Letters Pat. No. 4,845,454 issued to Watanabe et al. U.S. Letters Pat. No. 3,606,676 issued to Kohler discloses silicate bonding of magnetic cores wherein a silicon steel strip is coated with a silicate solution and dried prior to or after winding into a core. U.S. Letters Pat. No. 4,387,508 issued to Wyatt discloses an apparatus for magnetically assembling transformer cores. U.S. Letters Pat. No. 4,277,530 issued to Miller discloses adjacent sheets of electrical steel bonded by an adhesive. The adhesive is characterized by rapid curing at a temperature of less than 750° F.

Additional related references of which the applicant is aware are as follows:

| Inventor(s) | U.S. Pat. No. |
|---|---|
| Schuh | 2,280,981 |
| Ford | 2,372,074 |
| Amidon | 2,390,863 |
| Blessing | 2,423,869 |
| Foster | 2,484,215 |
| Young | 2,493,609 |
| Nagel et al | 2,501,349 |
| Nagel | 2,554,262 |
| Ford | 2,579,560 |
| McBride | 2,739,085 |
| Trig et al | 2,904,875 |
| Arntzen et al | 2,909,741 |
| Mittermaier et al | 3,513,523 |
| Denyssen | 3,558,396 |
| Foster et al | 3,670,278 |
| Foster et al | 3,919,348 |
| Schroeter et al | 3,924,022 |

-continued

| Inventor(s) | U.S. Pat. No. |
|---|---|
| Schroeter et al | 4,032,673 |
| Lichius | 4,085,347 |
| Miller | 4,277,530 |
| Hiromae et al | 4,288,492 |
| Lin | 4,445,105 |
| Ettinger et al | 4,479,104 |
| Sattler et al | 4,481,258 |
| Buckley | 4,503,605 |
| Shigeta et al | 4,558,297 |
| Perschka et al | 4,564,998 |
| Su | 4,618,632 |
| Ballard | 4,789,849. |

Although several of the references disclose laminated strips, bonding methods, amorphous metals and apparatus for assembling transformers, many problems relating to the use of amorphous metals in transformers are still unresolved. As noted amorphous metal is available only in relatively narrow widths which are not wide enough for transformer cores. Binding materials used in the lamination of these relatively narrow strips must have electrical and mechanical properties which are compatible with amorphous metal and with other components of the transformer so as not to degrade the performance of the transformer. Apparatus is required to economically and efficiently assemble the transformer components. A need exists to address these problems.

SUMMARY OF THE INVENTION

Accordingly, it is a primary object of the present invention to provide a device capable of laminating strips of amorphous metal having differing widths into a bonded laminate which can be cut to desired lengths.

It is a further object of the present invention to provide a laminated strip of amorphous metal having members of differing widths in the individual layers of the laminate.

It is still a further object of the present invention to provide a polymeric bonding material to bond the laminated amorphous metal strips while retaining the significant electrical properties of the amorphous metal.

It is another object of the present invention to provide a method for fabricating laminated strips of amorphous metal.

In accordance with the teachings of the present invention, there is disclosed a laminated amorphous metal strip including a first strip of amorphous metal having a width, and a second strip of amorphous metal having a width greater than the width of the first strip. The first strip is disposed adjacent to the second strip and is in a first plane with the second strip to form a first layer. A second layer is disposed above the first layer. The second layer has a third strip of amorphous metal which has a width substantially the same as the width of the second strip. The second layer further has a fourth strip of amorphous metal which has a width substantially the same as the width of the first strip. The third and fourth strips are disposed adjacent to one another and in a second plane. The disposition of the third and fourth strips is the reverse order of the disposition of the first and second strips such that the strips of the second layer overlap the strips of the first layer in a staggered arrangement. A plurality of layers are stacked in an alternating sequence of layers such that every other layer of the sequence is equivalent to the first layer. Every alternating layer of the sequence is equivalent to the second layer. A flexible polymeric bonding material is disposed between each layer of the amorphous metal strip. The polymeric bonding material provides mechanical bonding between the strips in the same layers and between the strips in the adjacent layer. The polymeric bonding material further reduces eddy current losses.

In further accordance with the teachings of the present invention there is disclosed a device for forming a laminated strip of amorphous metal. The device includes a first roll and a second roll of amorphous metal strips. The strips of each roll have an equal width. Also included are a third and fourth roll of amorphous metal strips. The strips of each roll have an equal width. The width of the strips of the third and fourth rolls are wider than the width of the strips of the first and second rolls. Means are provided for unrolling the first roll and the wider third roll such that the strips of the first roll are positioned side-by-side with the strips of the third roll. The strips further have a top surface. Means are provided for applying a polymeric bonding material to the top surface of the strips of the first roll and the third roll. Also, means are provided for unrolling the second roll and the wider fourth roll such that the strips of the second roll are positioned side-by-side with the strips of the fourth roll. Further, the wider strip is in the reverse order of the position of wider strip of the first and third strips. Means are provided for positioning the side-by-side strips of the second and fourth rolls on the polymeric bonding material on the surface of the strips of the first and third rolls at a pressure point. The wider strips overlap and a brickwork cross section pattern is formed. The strips are bonded into a single laminated strip which has a width substantially equal to the combined widths of the first roll and the third roll. Means are provided for advancing the laminated strip. Means are provided for cutting the laminated strip to a desired length.

Viewed in another aspect, the present invention provides a method of fabricating laminated strips of amorphous metal. This method includes the steps of providing a first roll and a second roll of amorphous metal strips, the strips of each roll having an equal width. A third roll and a fourth roll of amorphous metal strips are provided. The strips of each roll have an equal width. The width of the strips of the third roll nd the fourth roll are wider than the width of the strips of the first roll and the second roll. The first roll and the wider second roll are unrolled such that the strips of the first roll are positioned side-by-side with the strips of the third roll, to form a first layer. The layer further has a top surface. A polymeric bonding material is applied to the top surface of the layer of the first roll and the third roll. The second roll and the wider fourth roll are unrolled such that the strips of the second roll are positioned side-by-side with the strips of the fourth roll, to form a second layer. The wider strip is in the reverse order of the position of the wider strip of the first and third strips. The side-by-side strips of the second and fourth rolls are positioned on the polymeric bonding material on the surface of the strips of the first and third rolls at a pressure point. In this manner, the wider strips overlap and a brickwork cross section pattern is formed. Pressure is applied to the pressure point to bond the first layer to the second layer to form a single laminated strip having a width substantially equal to the combined widths of the first roll and the third roll. The laminated strip is advanced. The laminated strip is cut to a desired length.

These and other objects of the present invention will become apparent from a reading of the following specification, taken in conjunction with the enclosed drawings.

BRIEF DESCRIPTION OF THE PREFERRED EMBODIMENTS

Figure 1:
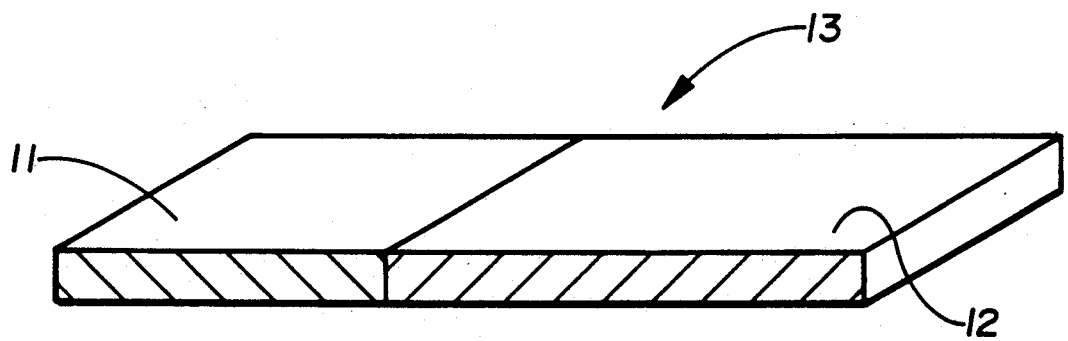
FIG. 1 is a perspective view showing the ends and bodies strips of amorphous metal of differing widths in a side-by-side position.
Figure 2:
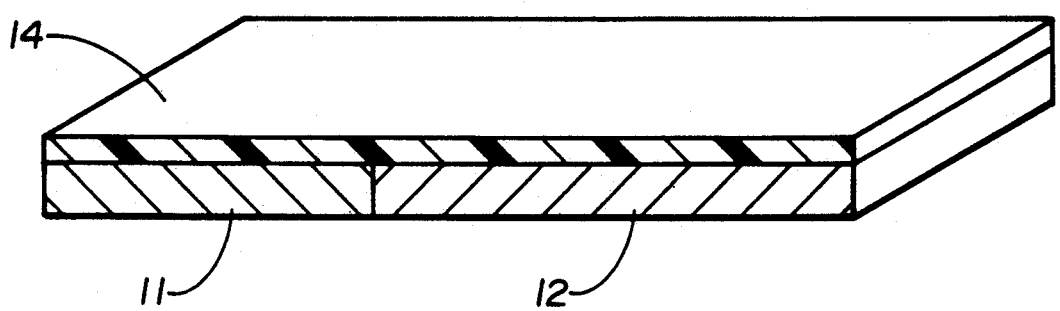
FIG. 2 is a perspective view of FIG. 1 showing the polymeric bonding material applied to the surface of the amorphous metal strips.
Figure 3:
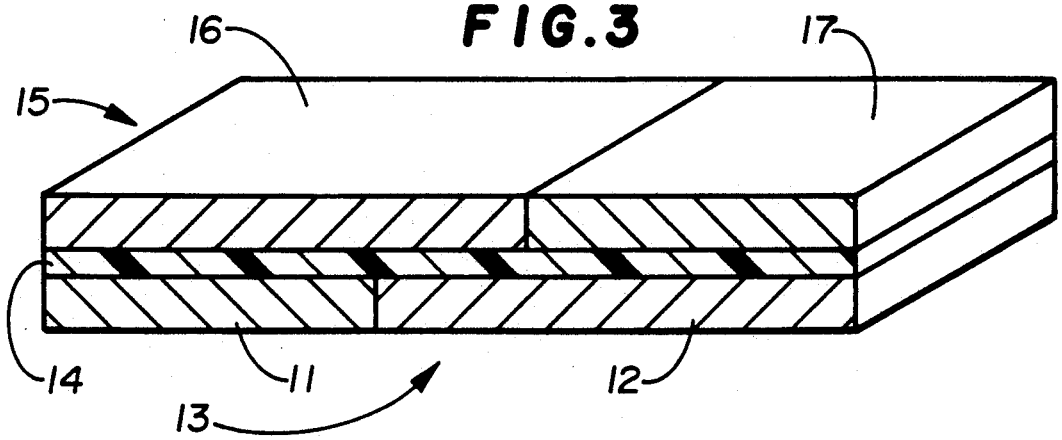
FIG. 3 is a perspective view of FIG. 3 showing a laminate of strips of amorphous metal disposed on the bonding material of FIG. 2 illustrating the reverse order of the wider strips.

With reference to FIG. 1, there is illustrated a first strip of amorphous metal 11 which is disposed adjacent (side-by-side) with a second strip of amorphous metal 12 to form a first layer 13 in a first plane. The second strip 12 has a width greater than the width of the first strip 11. A polymeric bonding material 14 is applied to the top surface of the strips which constitute the first layer 13 (FIG. 2). A second layer 15 of strips of amorphous metal is disposed above the first layer 13 with the polymeric bonding material 14 therebetween. The second layer 15 has a third strip of amorphous metal 16 disposed adjacent (side-by-side) with a fourth strip 17 of amorphous metal 17. The third strip 16 has a width which is substantially the width of the second strip 12. The fourth strip 17 has a width which is substantially the same as the width of the first strip 11. Thus, the third strip 16 has a width which is greater than the width of the fourth strip 17. The disposition of the third strip 16 and the fourth strip 17 are the reverse of the disposition of the first strip 11 and the second strip 12 with respect to the widths of the respective strips. In this manner, the strips of the second layer 15 overlap the strips of the first layer 13 in a staggered arrangement. This arrangement is similar to a brick work cross-section pattern. As shown in FIG. 3, this alternating sequence of layers may include a plurality of layers, each alternately equivalent to the first layer 13 and the second layer 15 to obtain a desired number of layers of equal widths. A coating of polymeric bonding material 14 is disposed between each adjacent layer.

The nature of the polymeric bonding material 14 is very important. The bonding material 14 serves as an adhesive to provide mechanical support for the component strips and also provides electrical insulation for use of the laminated strips in a transformer. The bonding material 14 must be sufficiently flexible to enable the formed laminate to be used in fabricating a transformer core. Also, in a process to be described, the laminate must have sufficient flexibility to move on a continuous belt conveyor. The bonding material must have a coefficient of shrinkage (or expansion) which is similar to the coefficient of shrinkage (or expansion) of the amorphous metal. There must be no mechanical stress placed on the brittle amorphous metal. Another important characteristic of the bonding material is its bonding strength to assure adherence of the layers to one another. This must be accomplished by use of a comparatively thin coating of the bonding material which adheres sufficiently at approximately room temperature and does not require heating to elevated temperatures for bonding of the layers of metal. Further, the electrical properties of the bonding material are a major consideration. The material must not contribute to losses due to eddy currents and hysteresis. These physical and mechanical properties must be considered throughout a wide thermal range to permit operation of the transformer in environmental extremes. In addition, the bonding material must be compatible with dielectric coolants used in transformers.

Among the polymeric bonding materials which have been found to be satisfactory are epoxy resin (epichlorohydrin phenolate type), neoprene base gasket cement, pressure sensitive acrtylonitrile butadiene elastomer with phenol-formaldehyde resin in a solution with acetone and methylethyl ketone, an electrical grade silicone varnish and an electrical grade silicone grease.

When the transformer core is stacked and not coil wound, the gasket cement may be applied at the interface of the amorphous metal strips which are mated and bonded. After curing, the strip is sheared for core laminations.

The silicone varnish and the silicone grease may be used for laminating strips of amorphous metal which will be coil wound or core stacked. The silicone bonding material is applied at the interface of the amorphous metal strips and the strips are mated. The silicone grease requires no curing and may be used for core wound or core stacked transformers. The silicone varnish, when uncured, provides flexibility for coiling and eliminates coil setting. For core stacking, the laminate bonded with silicone varnish may be sheared, stacked and then cured completely or partially. Alternately, the laminate bonded with the silicone varnish may be cured, sheared and core stacked.

Figure 4:
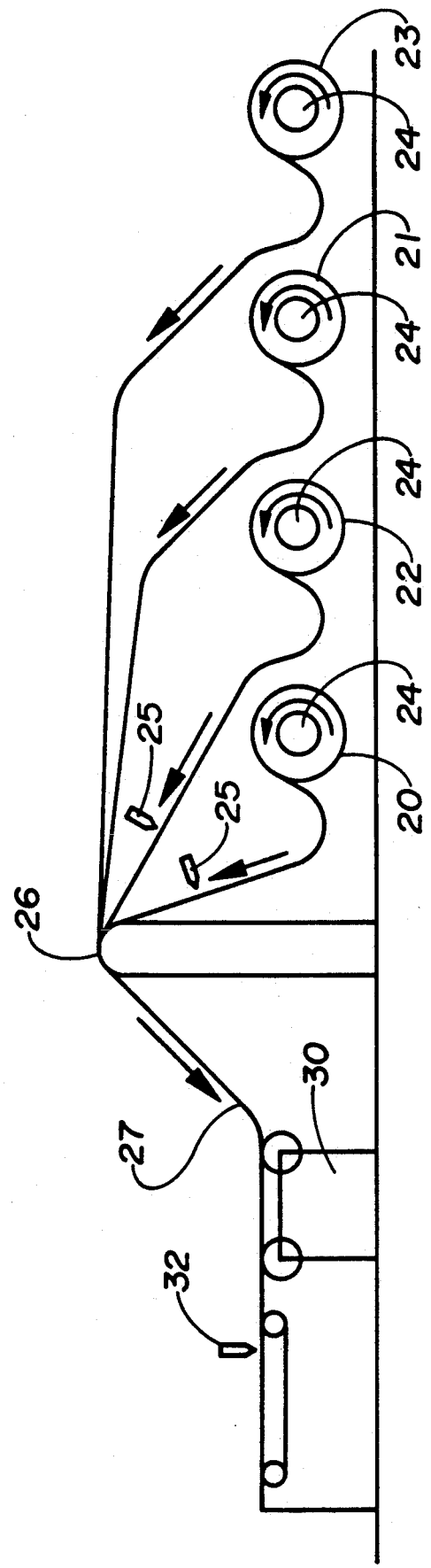
FIG. 4 is a schematic view showing the device for forming the laminated amorphous metal strip.

A device for forming the laminated amorphous metal is illustrated in FIG. 4. A plurality of rolls of amorphous metal (20-23) are mounted on powered uncoilers 24. Each powered uncoiler 24 is controlled by a sonic sensor or similar control means. In a preferred embodiment, two rolls 20, 21 have equal widths and two rolls 22, 23 have equal widths which are wider than the other two rolls 20, 21. The rolls are unrolled such that a strip of roll 20 and a strip of wider roll 22 are positioned side-by-side to form a first layer having a width equal to the sum of the widths of the component rolls 20, 22. When positioned side-by-side, the strips should be as close together as possible; the space between the strips preferably being approximately 0 to 0.030 inches. Each strip has an upper surface and a polymeric bonding material is applied to the upper surface of each roll 20, 22, preferably by means of a spray gun 25. The remaining rolls 21, 23 are unrolled and the strips are positioned side-by-side forming a second layer having the reverse order of the position of the rolls 20, 22 with respect to the wider strip. The strips of rolls 21, 23 are positioned on the polymeric bonding material such that the bonding material is between the first layer and the second layer. Guiding and alignment of each strip through the device is accomplished by supporting the respective strip on rigid flat ramps and aligning the strip with rigid hardened steel bars. The bottom strips 20, 22 are aligned on inside edges so that a predetermined gap is set between the strips 20, 22. Alignment of the top two strips 21, 23 outer edges is made to the outer edges of the bottom strips 20, 22. In this manner a laminate 27 is formed with the wider strips overlapping in a staggered arrangement like a brick work cross-section pattern. The laminate 27 is pressed at a pressure point 26 to assure satisfactory adhesion of the layers and the bonding material. The pressure point 26 is curved to effect turns in the travel of the strip such that ironing and compressive forces are eliminated. These forces could result in shear forces between laminations and a fracture of the lamination bonds. The laminate 27 is advanced by a continuous belt drive 30 which has permanent magnets thereon. The laminate 27 is magnetically coupled to the belt. This advancement method exerts an adequate force to drive the device while eliminating undesirable side steering forces which are typically exerted with drive rolls. The laminate 27 is further advanced to an automatic shear 32 means to cut the laminate 27 to a desired length.

The laminate may have more than two (2) layers by applying bonding material to the surface of the second layer and positioning strips in a reverse order to form a third layer and repeating the sequence to obtain a desired number of laminations. In this manner, a laminate having a desired thickness may be obtained.

Figure 5:
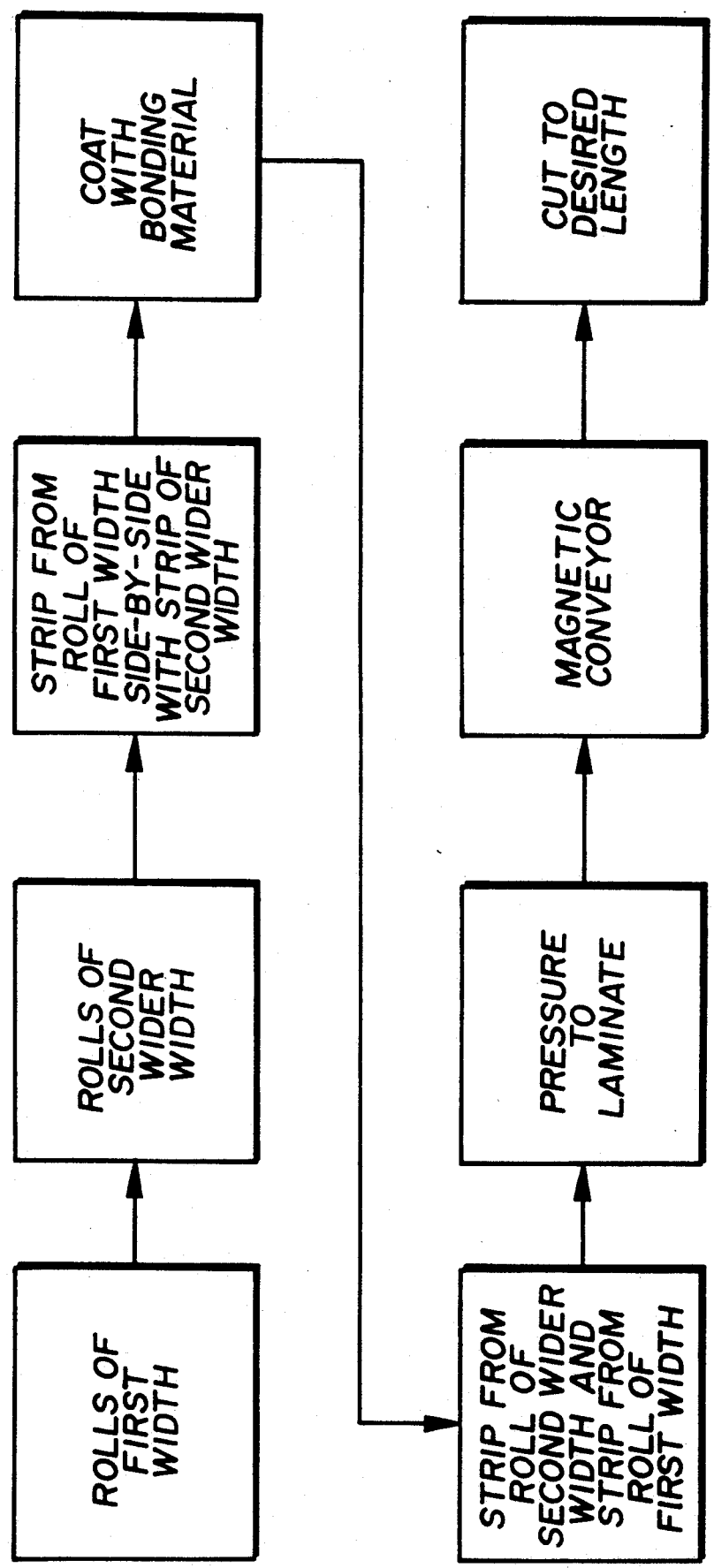
FIG. 5 is a sequence diagram showing the method of fabricating the laminated amorphous metal strips.

With reference to FIG. 5, a method of fabricating a laminated strip of amorphous metal is illustrated. First and second rolls of amorphous metal of equal width are provided and third and fourth rolls of amorphous metal are provided having equal widths, the widths being wider than the first and second rolls. The rolls are unrolled by means of powered uncoilers on the respective rolls. The payoff of the roll is controlled by a sonic sensor or other means known to persons skilled in the art. The respective first and third rolls are unrolled to provide a first strip side by side with a wider third strip to form a first layer. The respective strips have a top surface on which is applied the bonding material. Preferably, spray guns are used to spray the bonding material uniformly on the top surface of the first layer. The respective second and fourth rolls are unrolled to provide a second strip side-by-side with a wider fourth strip to form a second layer. The wider strip in the second layer is in the reverse order of the wider strip of the first layer. The wider strips in the adjacent layers overlap and a brickwork cross-section pattern is formed. Pressure is applied at a pressure point to securely bond the first layer to the second layer and form a single laminated strip having a width equal to the combined widths of the first roll and the second roll. Alternately, the laminate may be formed of plurality of layers with a coating of bonding material between the adjacent layers. A desired number of layers may be obtained. Each respective adjacent layer has an overlap of wider strips such that the brickwork cross-section pattern is formed in the laminate. The laminate is advanced by a continuous belt which has permanent magnets thereon. The laminate is magnetically coupled to the belt. A shearing means is provided which cuts the laminated strip to a desired length.

Obviously, many modifications may be made without departing from the basic spirit of the present invention. Accordingly, it will be appreciated by those skilled in the art that within the scope of the appended claims, the invention may be practiced other than has been specifically described herein.

What is claimed is:

1. A method of fabricating a laminated strip of amorphous metal which comprises the steps of:

providing a first roll and a second roll of amorphous metal strips, the strips of the first roll and of the second roll having an equal width;

providing a third roll and a fourth roll of amorphous metal strips, the strips of the third roll and of the fourth roll having an equal width, the width of the strips of the third roll and the fourth roll begin wider than the width of the strips of the first roll and the second roll;

unrolling the first roll and the wider third roll such that the strips of the first roll are positioned side-by-side with the strips of the third roll to from a first layer, the layer having a top surface;

applying a thin coating of a polymeric bonding material which is compatible with dielectric coolants used in transformers, does not contribute to losses due to eddy currents and hysteresis and has a coefficient of expansion similar to that of the amorphorous metal to the top surface of the layer of strips of the first roll and the third roll;

unrolling the second roll and the wider fourth roll such that the strips of the second roll are positioned side-by-side with the strips of the fourth roll to form a second layer and further such that the wider strip is int the reverse order of the position of wider strip of the first and third strips;

positioning the side-by-side strips of the second and fourth rolls on the polymeric bonding material on the surface of the strips of the first and third rolls at a curved pressure point such that the wider strips overlap and a brickwork cross-section pattern is formed;

applying pressure to the curved pressure point at approximately room temperature to bond the first layer to the second layer to form a single laminated strip having a width substantially equal to the combined widths of the strips of the first roll and the third roll, such that compressive forces that could result in fracture of the laminated strip are eliminated;

advancing the laminated strip;

cutting the laminated strip to a desired length,

2. The method as defined by claim 1 wherein the step of unrolling the respective rolls comprises using a separate power uncoiler connected to each respective roll, each power uncoiler being controlled by a sonic sensor.

3. The method as defined by claim 1 wherein the step of advancing the laminated strip comprises magnetically coupling the laminated strip to a continuous belt conveyor having magnets thereon.

* * * * *